United States Patent [19]
Imaizumi et al.

[11] 3,894,819

[45] July 15, 1975

[54] EXHAUST PORT OF A ROTARY PISTON ENGINE

[75] Inventors: Kenichi Imaizumi; Masanobu Yoshika, both of Toyota, Japan

[73] Assignee: Toyota Jidosha Kogyo Kabushiki Kaisha, Japan

[22] Filed: Dec. 20, 1973

[21] Appl. No.: 426,580

[30] Foreign Application Priority Data
July 18, 1973 Japan.............................. 48-80286

[52] U.S. Cl............................ 418/61 A; 123/8.01
[51] Int. Cl......... F01c 1/02; F04c 1/02; F02b 53/00
[58] Field of Search ......... 418/61 A, 113; 123/8.01, 123/8.45

[56] References Cited
UNITED STATES PATENTS
3,448,727   6/1969   Kobayakawa.................... 418/61 A

*Primary Examiner*—John J. Vrablik
*Attorney, Agent, or Firm*—Stewart and Kolasch, Ltd.

[57] ABSTRACT

An exhaust port of a rotary piston engine of the type comprising at least two side housings and a center housing interposed therebetween to define a casing in which a polygonal rotor eccentrically rotates with its apexes contacting the inner surface of said center housing in a manner to perform respective strokes of an internal combustion engine, said exhaust port being provided at the wall of said center housing and adapted to be controlled of its opening and closing by being traversed by the apexes of said rotor, wherein the opening of the exhaust port is so designed that the inequalities $$\left(\frac{d^2S}{d\theta^2}\right)\theta=\theta_1 > 0 > \left(\frac{d^2S}{d\theta^2}\right)\theta=\theta_2, \text{ and } \frac{d^3S}{d\theta^3} < 0, \text{ are satisfied}$$

6 Claims, 7 Drawing Figures

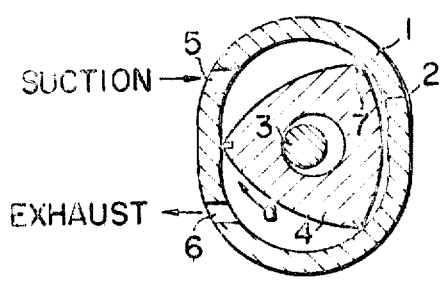
FIG. 1    FIG. 2 PRIOR ART    FIG. 3 PRIOR ART
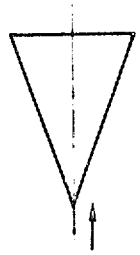
DIRECTION OF MOVEMENT OF APEX SEAL
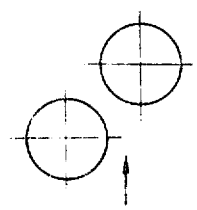
DIRECTION OF MOVEMENT OF APEX SEAL
FIG. 4 PRIOR ART
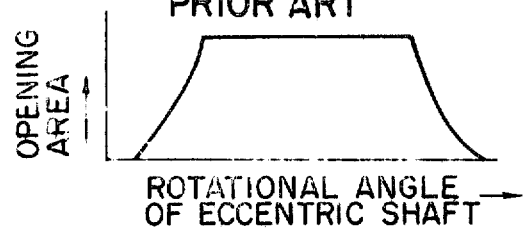
FIG. 5 PRIOR ART
FIG. 6
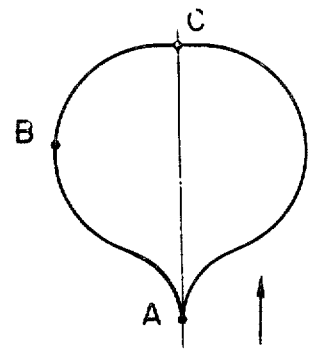
DIRECTION OF MOVEMENT OF APEX SEAL
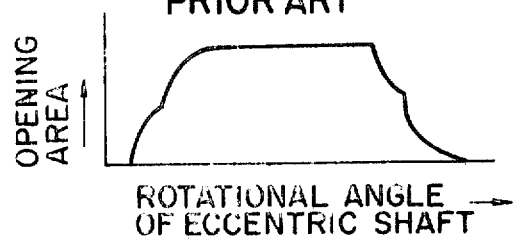
FIG. 7
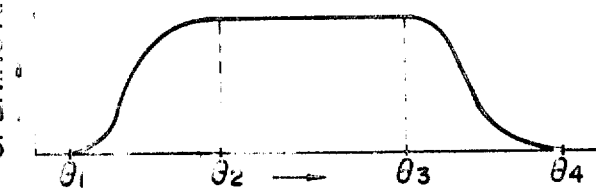
ROTATIONAL ANGLE OF ECCENTRIC SHAFT($\theta$)

EXHAUST PORT OF A ROTARY PISTON ENGINE

BACKGROUND OF THE INVENTION

1. Field of the Invention

This invention is related to a rotary piston engine of the type comprising at least two side housings and a center housing interposed therebetween to define a casing, and a polygonal rotor adapted to eccentrically rotate in said housing with its apexes contacting the inner surface of said center housing in a manner to perform respective strokes such as suction, compression, combustion, expansion and exhaust strokes according to the change of volumes of operating spaces defined by co-operation of said casing and said rotor. More particularly the present invention is directed to, an exhaust port of such a rotary engine.

2. Description of the Prior Art

In the rotary piston engine of the type as mentioned above, the exhaust port for respective operating chambers are provided by openings formed at the wall of the center housing, and the opening and closing of the port according to the operation of the engine are adapted to be controlled by the apexes of the rotor moving to traverse the port. Conventionally, there has been generally used a circular port as the exhaust port. However, in the case of the circular port which is traversed by a linear apex of the rotor, to be opened as well as closed, there occurs a large changing rate of the port opening area in the leading end region preceeding the full closing of the port where the once fully opened port is again being closed. The large changing rate of the port opening area causes abrupt opening and closing of the port which causes abrupt exhausting and stopping of the exhaust gases from the operating chamber of the engine, generating percussive noises which is one of the serious causes of the exhausting noise.

As a countermeasure to such a problem, it has been proposed to provide a plurality of circular ports arranged to partially overlap along the direction of the moving apexes of the rotor or the apex seals provided at said portions of the rotor, or to employ a triangular port, thereby lessening the abrupt changing of the port opening ratio at the leading and trailing end regions. However, the port structures as conventionally proposed are still bound with discontinuity in the change of the opening ratio of the port at the opening and closing thereof, and, in addition, when a plurality of ports are employed in parallel arrangement, there occurs another problem that the structure of the engine is made more complicated, especially when air injection into the exhaust port is performed for the purpose of cleaning the exhaust gases.

SUMMARY OF THE INVENTION

Therefore, it is the object of this invention to solve the abovementioned problem and to provide an improved structure of the exhaust port of a rotary piston engine wherein the noise due to the abrupt opening and closing of the exhaust port is attenuated by smoothening the exhausting operation even by employing only one port.

The abovementioned object is accomplished, according to this invention, by an exhaust port of a rotary piston engine of the type mentioned in the beginning of the description, said exhaust port being at the wall of said center housing and adapted to be controlled of its opening and closing by being traversed by the apexes of said rotor, characterized in that, expressing the rotational angle of an eccentric shaft carrying said rotor as $\theta$ and the opening area of said exhaust port as S, the conditions $$\left(\frac{d^2 S}{d\theta^2}\right) \theta = \theta_1 > 0 > \left(\frac{d_2 S}{d\theta^2}\right) \theta = \theta_2 \quad (1)$$

$$\frac{d^3 S}{d\theta^3} < 0 \quad (2)$$

are satisfied in the leading end region ($\theta_1 \leq \theta \leq \theta_2$) i.e. an operational region extending from the initiation ($\theta = \theta_1$) of opening of said port to the attainment ($\theta = \theta_2$) of the fully opened condition of said port. An example of an equation which satisfied the inequalities (1) and (2) above is $S = S_0/2$ $$S = S_0/2 \left[1 - \cos\left(\pi \frac{\theta - \theta_1}{\theta_2 - \theta_1}\right)\right]$$

wherein $S_0$ represents the full opening area of the exhaust port and S represents the opening area at the moment when the rotational angle of the eccentric shaft is $\theta$.

In operation, when an apex portion of the rotor traverses an exhaust port in the leading end region thereof to open the port with the abovementioned conditions being satisfied, the opening ratio of the port starts from zero and is kept at a very low value in the beginning but gradually increases until the increasing rate of the opening ratio reaches the maximum value, and thereafter, the increasing rate gradually decreases with moderating increasing of the opening ratio until it reaches 100% or the fully opened condition. When the exhaust port is opened by way of such an increasing process of the port opening ratio, the exhausting of the exhaust gases from the exhaust port is smoothly started and it is attained to lessen the large percussive noise to be generated especially at the starting of the exhausting.

According to this invention, in the trailing end region ($\theta_3 \leq \theta \leq \theta_4$), i.e., a region preceding the fully closing of the exhaust port when an apex portion of the rotor closes to the trailing end of the exhaust port and traverses the same, it is also attained to lessen the noises by avoiding an abrupt change in the flow of the exhaust gases by the following conditions being satisfied:

$$\left(\frac{d^2 S}{d\theta^2}\right) \theta = \theta_3 < 0 \quad \left(\frac{d^2 S}{d\theta^2}\right) \theta = \theta_4$$

$$\frac{d^3 S}{d\theta^3} < 0$$

According to the above conditioned structure, it is possible to smoothly stop the flow of the exhaust gases when the exhaust port is closed, whereby a substantial reduction in the noise due to the percussive changes of the exhaust gas flow at the time of opening and closing the exhaust port is achieved.

BRIEF DESCRIPTION OF THE DRAWING

In the accompanying drawing,

FIG. 1 is a sectional view showing a common structure of a rotary piston engine;

FIGS. 2 and 3 are illustrations showing examples of the shapes of the conventional exhaust port;

FIGS. 4 and 5 are graphs showing the changes of the opening area of the exhaust port as shown in FIGS. 2 and 3, respectively, with respect to the rotational angle of the eccentric shaft carrying the rotor;

FIG. 6 is an illustration showing an embodiment of the shape of the exhaust port according to this invention, and;

FIG. 7 is a graph showing the change of the opening area of the exhaust port as shown in FIG. 6 with respect to the rotational angle of the eccentric shaft.

DESCRIPTION OF THE PREFERRED EMBODIMENT

In the following, this invention is described in more detail of a preferred embodiment with reference to the accompanying drawing.

Referring to FIG. 1, which is a schematically sectional view showing an example of a rotary piston engine forming the object of this invention, 1 is a center housing having a trochoidal inner surface, the opposite open ends thereof being closed by side housings 2 to define an internal space therein, said space being divided into several operating spaces by a polygonal rotor 4 mounted in the space to be eccentrically rotatable about an eccentric shaft 3 in the manner that said operating spaces perform respective strokes such as suction, compression, combustion, expansion and exhaust strokes according to the change of volumes thereof due to the rotation of the rotor. The center housing 1 is provided with an inlet port 5 and an exhaust port 6 opening to the inner surface thereof.

FIGS. 2 and 3 show examples of the cross sectional shape of the conventional exhaust port 6, wherein the exhaust port shown in FIG. 2 has a triangular shape. In this case, when the apex portion of the rotor 4, or actually the apex seal 7 thereof traverses the opening portion of the exhaust port 6 in the direction of arrow $a$ in FIG. 1 according to the rotation of the rotor, the opening area of the exhaust port changes following the process as shown in FIG. 4 with respect to the rotational angle of the eccentric shaft. In the example shown in FIG. 3, the exhaust port 6 is composed of two ports each having a circular cross section arranged to partially overlap in the moving direction of the apex seal. In this structure of the exhaust port, the opening area changes according to the process as shown in FIG. 5 with respect to the rotational angle of the eccentric shaft. In the both conventional shapes of the exhaust port, it is noted that the opening area of the port changes abruptly at several time points according to the rotation of the eccentric shaft, causing percussive changes of the flow of the exhaust gases in these time points.

FIG. 6 shows a shape of the opening portion of an embodiment of the exhaust port according to this invention, said shape being so determined that the opening area (S) takes the changing process as shown in FIG. 7 with respect to the rotational angle ($\theta$) of the eccentric shaft. In more detail, in case of opening the exhaust port, the opening of the exhaust port is initiated when an apex seal 7 acting as an apex seal at the leading side for a concerned operating space passes point A ($\theta = \theta_1$), and when the apex seal has reached point C ($\theta = \theta_2$) by way of point B, the opening process of the exhaust port is completed and the exhaust port attains its fully opened condition. In this case, the opening shape of the exhaust port determined by the curved line A-B-C is properly determined so that the inequalities 1 and 2 are satisfied according to the movement of the apex seal due to the rotation of the eccentric shaft.

When the exhaust port is closed from its fully opened condition, the closing of the port is initiated when another apex seal acting at the trailing side of the concerned operating space passes point A ($\theta = \theta_3$), and when the apex seal has reached point C ($\theta = \theta_4$) by way of point B, the port attains its fully closed condition. In this case, the changing process of the opening area in the region $\theta_3 - \theta_4$ with respect to the rotational angle of the eccentric shaft is of the same changing rate as in the range $\theta_1 = \theta_2$ but inversely signed.

From the foregoing, it will be appreciated that the exhaust port constituted according to this invention causes in no time point extending from a first fully closed condition to the next fully closed condition by way of a fully opened condition an abrupt change of the opening ratio thereby to always keep a small changing rate thereof, whereby the flow of the exhaust gases flowing through the exhaust port is not caused any abrupt change, lessening the noise due to the exhausting of the exhaust gases.

We claim:

1. An exhaust port of a rotary piston engine, said engine comprising at least two side housings and a center housing interposed therebetween to define a casing, and a polygonal rotor adapted to eccentrically rotate in said housing with its apexes contacting the inner surface of said center housing in a manner to perform respective strokes such as suction, compression, combustion, expansion and exhaust strokes according to the changes of volumes of operating spaces defined by a co-operation of said casing and said rotor, said exhaust port being provided at the wall of said center housing and adapted to be controlled of its opening and closing by being traversed by the apexes of said rotor, characterized in that, expressing the rotational angle of an eccentric shaft carrying said rotor as $\theta$ and the opening area of said exhaust port as S, the conditions $$\left(\frac{d^2s}{d\theta^2}\right)\theta=\theta_1 >0> \left(\frac{d^2s}{d\theta^2}\right)\theta=\theta_2$$

$$\frac{d^3s}{d\theta^3} <0$$

are satisfied in the leading end region ($\theta_1 \leqq \theta \leqq \theta_2$), i.e. an operational region extending from the initiation ($\theta = \theta_1$) of opening of said port to the attainment ($\theta = \theta_2$) of the fully opened condition of said port.

2. An exhaust port according to claim 1, wherein the conditions $$\left(\frac{d^2s}{d\theta^2}\right)\theta=\theta_3 <0< \left(\frac{d^2s}{d\theta^2}\right)\theta=\theta_2$$

$$\frac{d^3s}{d\theta^3} >0$$

are satisfied in the trailing end region ($\theta_3 \leqq \theta \leqq \theta_4$), i.e. an operational region extending from the initiation ($\theta = \theta_3$) of closing of said port to the attainment ($\theta = \theta_4$) of the fully closed condition of said port.

3. In an exhaust port of a rotary piston engine, said engine comprising at least two side housings and a center housing interposed therebetween to define a casing, and a polygonal rotor adapted to eccentrically rotate in said housing with its apexes contacting the inner surface of said center housing in a manner to perform respective strokes such as suction, compression, combustion, expansion and exhaust strokes according to the changes of volume of operating spaces defined by a co-operation of said casing and said rotor, said exhaust port being provided at the wall of said center housing and adapted to be controlled of its opening and closing by being traversed by the apexes of said rotor, the improvement which comprises using a single exhaust port which is characterized by expressing the rotational angle of an eccentric shaft carrying said rotor as $\theta$ and the opening area of said exhaust port as S, and satisfying the conditions.

$$\left(\frac{d^2S}{d\theta^2}\right)\theta = \theta_1 > 0 > \left(\frac{d^2S}{d\theta^2}\right)\theta = \theta_2$$

$$\frac{d^3S}{d\theta^3} < 0$$

in the leading end region ($\theta_1 \leqq \theta \leqq \theta_2$), i.e. an operational region extending from the initiation ($\theta = \theta_1$) of opening of said port to the attainment ($\theta = \theta_2$) of the fully opened condition of said port.

4. An exhaust port according to claim 3, wherein the conditions $$\left(\frac{d^2S}{d\theta^2}\right)\theta = \theta_3 < 0 < \left(\frac{d^2S}{d\theta^2}\right)\theta = \theta_4$$

$$\frac{d^3S}{d\theta^3} > 0$$

are satisfied in the trailing end region ($\theta_3 \leqq \theta \leqq \theta_4$), i.e. an operational region extending from the initiation ($\theta = \theta_3$) of closing of said port to the attainment ($\theta = \theta_4$) of the fully closed condition of said port.

5. A rotary piston engine having a single exhaust port, said engine comprising at least two side housings and a center housing therebetween to define a casing, and a polygonal rotor adapted to eccentrically rotate in said housing with its apexes contacting the inner surface of said center housing in a manner to perform respective strokes such as suction, compression, combustion, expansion and exhaust strokes according to the changes of volumes of operating spaces defined by a co-operation of said casing and said rotor, said exhaust port being provided at the wall of said center housing and adapted to be controlled of its opening and closing by being traversed by the apexes of said rotor, characterized in that, expressing the rotational angle of an eccentric shaft carrying said rotor as $\theta$ and the opening area of said exhaust port as S, the conditions $$\left(\frac{d^2S}{d\theta^2}\right)\theta = \theta_1 > 0 > \left(\frac{d^2S}{d\theta^2}\right)\theta = \theta_2$$

$$\frac{d^3S}{d\theta^3} < 0$$

are satisfied in the leading end region ($\theta_1 \leqq \theta \leqq \theta_2$), i.e. an operational region extending from the initiation ($\theta = \theta_1$) of opening of said port to the attainment ($\theta = \theta_2$) of the fully opened condition of said port.

6. An exhaust port according to claim 5, wherein the conditions $$\left(\frac{d^2S}{d\theta^2}\right)\theta = \theta_3 < 0 < \left(\frac{d^2S}{d\theta^2}\right)\theta = \theta_4$$

$$\frac{d^3S}{d\theta_3} > 0$$

are satisfied in the trailing end region ($\theta_3 \leqq \theta \leqq \theta_4$), i.e. an operational region extending from the initiation ($\theta = \theta_3$) of closing of said port to the attainment ($\theta = \theta_4$) of the fully closed condition of said port.

* * * * *